March 28, 1961     K. V. KRATOCHVIL     2,977,472

RECORDING SYSTEM

Filed Feb. 10, 1958     2 Sheets-Sheet 1

INVENTOR.
K.V. KRATOCHVIL

BY Hudson & Young

ATTORNEYS

March 28, 1961     K. V. KRATOCHVIL     2,977,472

RECORDING SYSTEM

Filed Feb. 10, 1958     2 Sheets-Sheet 2

INVENTOR.
K. V. KRATOCHVIL

BY Hudson & Young

ATTORNEYS

United States Patent Office 2,977,472
Patented Mar. 28, 1961

2,977,472

RECORDING SYSTEM

Kenneth V. Kratochvil, Bartlesville, Okla., assignor to Phillips Petroleum Company, a corporation of Delaware Filed Feb. 10, 1958, Ser. No. 714,279

4 Claims. (Cl. 250—41.9)

This invention relates to apparatus for recording a plurality of signals which are received in sequence.

In various industrial and laboratory operations, there is a need for analysis procedures which are capable of measuring small concentrations of constituents in fluid mixtures. One analysis procedure which presently is becoming quite valuable for fluid analysis involves elution chromatography. In elution chromatography, a sample of the material to be separated is introduced into a column which contains a selective adsorbent. A carrier gas is directed into the column so as to tend to force the sample material through the column. The adsorbent attempts to hold the constituents of the sample, whereas the stripping gas tends to pull them through the column. This results in the several constituents of the fluid mixture traveling through the column at different rates of speed, depending upon their affinities for the packing material. The column effluent thus consists initially of the carrier gas alone, the individual constituents of the fluid mixture appearing at later spaced time intervals. It is common practice to detect these constituents by means of a thermal conductivity analyzer which compares the thermal conductivity of the effluent gas with the thermal conductivity of the carrier gas directed to the column.

A second type of analysis procedure which provides valuable information regarding the composition of sample materials involves the principles of mass spectrometry. A sample of the material to be analyzed is ionized and the resulting ions are accelerated by the application of electrical potentials toward a collecting electrode. The ions are separated in some manner, as by the application of magnetic and/or electrostatic forces, in accordance with their masses so that only ions of a preselected mass are indicated by a detector which is connected to the collecting electrode.

Both of the foregoing types of analyzers are particularly useful in measuring the individual constituents of fluid mixtures. However, such analyzers necessarily operate in a "batchwise" manner when employed to detect more than one constituent in a fluid mixture. The output signals thus comprise a series of peaks which appear in a timed sequence. This type of information is somewhat difficult to employ for control purposes, and the interpretation of such data is not as simple as is generally desirable.

In accordance with the present invention, an improved recording system is provided for presenting a series of pulses adjacent one another on a common recording medium. The invention advantageously utilizes a conventional strip chart type recorder. The recording medium is divided into a plurality of zones, each of which extends longitudinally of the direction of movement of the medium. The recording arm is biased laterally of the direction of movement of the medium in a time sequence so that the individual peaks of the signal to be recorded appear on the individual zones of the recording medium. A programmer controls movement of the recording medium so that the individual peaks appear adjacent one another in the several zones. It is preferred that the peaks be recorded as single lines, the heights of which are representative of the magnitude of the peak to be measured.

Accordingly, it is an object of this invention to provide apparatus for recording the output signals from instruments, such as chromatographic analyzers and mass spectrometers, in an orderly manner which can readily be interpreted by process operators.

Another object is to provide novel analysis apparatus.

A further object is to provide apparatus for recording a plurality of signals which arrive in sequence adjacent one another on a common recording medium.

Other objects, advantages and features of this invention should become apparent from the following detailed description which is taken in conjunction with the accompanying drawing in which.

Figure 1:
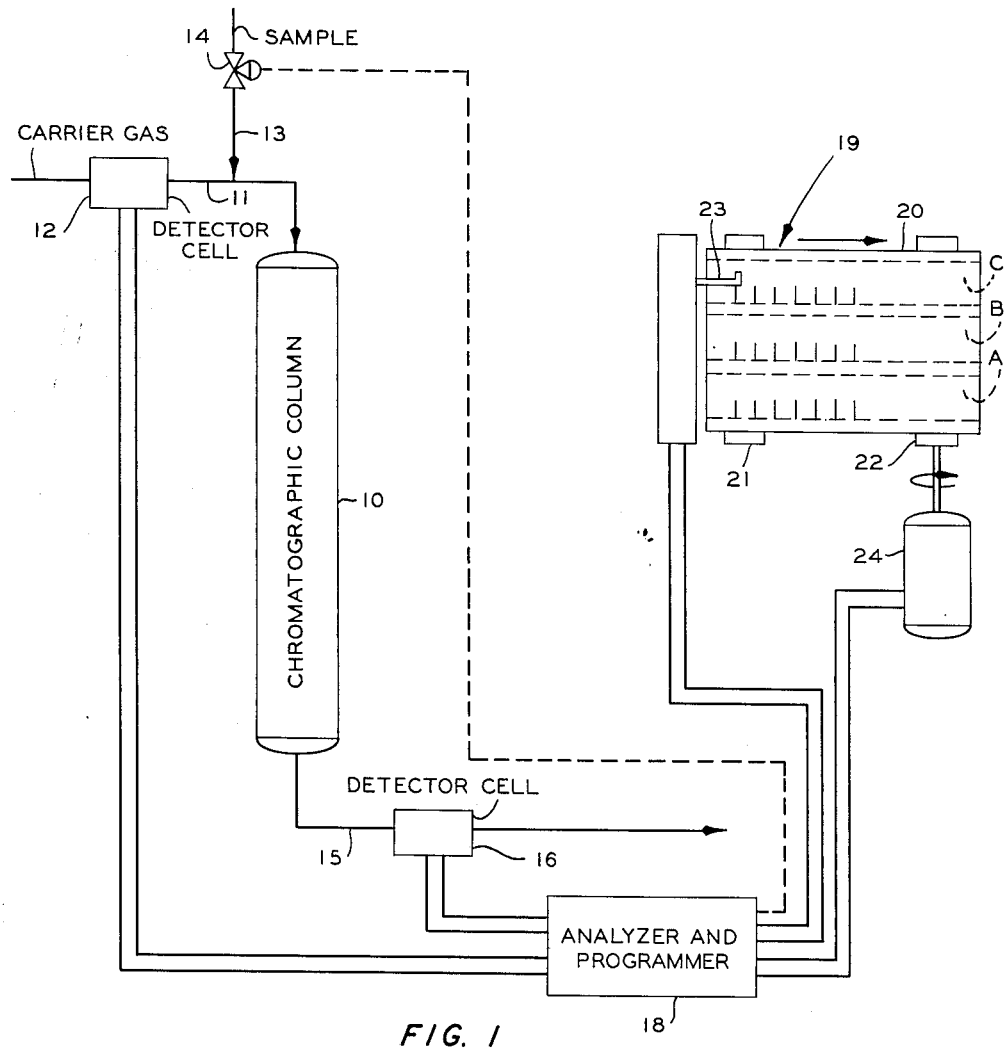
Figure 1 is a schematic representation of a chromatographic analyzer having the recording system of this invention associated therewith.

Referring now to the drawing in detail, and to Figure 1 in particular, there is shown a column 10 which is filled with a suitable packing material that selectively retards passage therethrough of the individual constituents of a fluid mixture to be analyzed. A carrier gas is introduced into one end of column 10 by means of a conduit 11 which has a detector cell 12 included therein. A sample of the material to be analyzed is introduced periodically into first end of column 10 by means of a conduit 13 which has a control valve therein. The effluent from column 10 is removed through a conduit 15 which has a second detector cell 16 therein.

The type of material employed in column 10 and the carrier gas employed depend to a large extent on the composition of the fluid mixture to be analyzed. The column can be filled with an adsorption material, such as charcoal, silica gel, alumina and the like. The column can also be filled with an inert solid material, such as crushed fire brick which is coated by a solvent, such as hexadecane or benzyl ether. Examples of suitable carrier gases include: helium, hydrogen, carbon dioxide, nitrogen, argon and air. The detector cells preferably comprise thermistors which are disposed in thermal contact with the fluids flowing through respective conduits 11 and 15. These two detector cells are connected in an analyzer and programmer circuit 18 which provides an output signal representative of the difference in composition of the fluids flowing through cells 12 and 16. This output signal is applied to a recorder 19.

Recorder 19 preferably is a strip chart recorder which comprises a paper 20 that is mounted on rollers 21 and 22. The output signal from the analyzer displaces a recording pen 23 a direction perpendicular to the direction of movement of paper 20. A suitable bias potential is added to the output signal of the analyzer in the manner described hereinafter so that pen 23 selectively marks on zones A, B and C into which paper 20 is divided. Programmer 18 provides an output signal which energizes chart motor 24 at preselected time intervals to move paper 20. Programmer 18 also provides an output signal which opens valve 14 for predetermined periods of time at selected time intervals.

Figure 2:
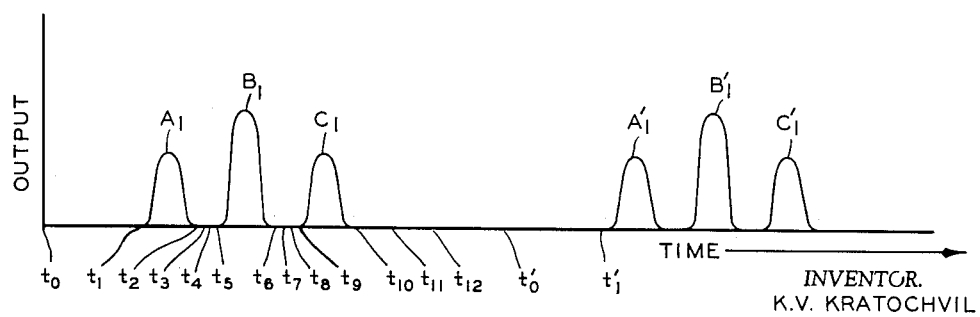
Figure 2 is a graphical representation of a typical output signal from analytical instruments such as chromatographic analyzers and mass spectrometers.

In Figure 2 there is shown a graphical representation of a typical output signal from a chromatographic analyzer of the type described. The carrier gas initially is passed through column 10 to purge the column of any constituents of a sample mixture which may have been retained from a previous analysis. A preselected volume of the sample to be analyzed is then introduced into the column. The carrier gas tends to sweep the sample on through the column, whereas the packing material in the column selectively retards passage therethrough of the individual constituents of the sample mixture. The net result is that these constituents appear in the column effluent at spaced time intervals. At time $t_1$, the constituent of the sample mixture which is the least adsorbed begins to appear in the effluent from column 10. This constituent changes the thermal conductivity of the column effluent so that an output signal appears from the analyzer, as indicated by peak $A_1$. At times $t_5$ and $t_9$, the second and third constituents of the sample mixture appear as peaks $B_1$ and $C_1$, respectively. If the analysis procedure is subsequently repeated, corresponding peaks $A_1'$, $B_1'$ and $C_1'$ appear at corresponding later times.

The curve of Figure 2 represent a typical output signal from a conventional chromatographic analyzer. It should be evident that a signal of this type is somewhat difficult to interpret readily because peaks widely spaced from one another must be compared to determine changes in composition of the sample mixture. In accordance with the present invention, all of the peaks representing the first constituent appear as vertical lines in zone A on paper 20. The second and third components appear as vertical lines in respective zones B and C. Lines corresponding to peaks $A_1$, $B_1$ and $C_1$ of Figure 2 appear at the same time on paper 20. It should be evident that this type of recorded signal can much more readily be interpreted because an operator is provided with three separate lines representative of the individual constituents of the fluid mixture. Changes in composition of the fluid mixture with respect to time can readily be detected merely by observing whether the recorded vertical lines are longer or shorter. The analyzer and programmer circuit 18 is illustrated in detail in Figure 3. The first terminals of thermistors 12′ and 16′, which are disposed in respective cells 12 and 16, are connected to one another and to the first input terminal of recorder 19. A voltage source 30 is connected between the second end terminals of thermistors 12′ and 16′. The end terminals of a potentiometer 31 are connected to the respective second terminals of thermistors 12′ and 16′. The contactor of potentiometer 31 is connected to the first terminal of a voltage source 32 and to a terminal $A_2$. The second terminal of voltage source 32 is connected to a terminal $C_2$. Resistors 33 and 34 are connected in series relationship between terminals $A_2$ and $C_2$, the junction between these resistors being designated as terminal $B_2$. Terminals $A_2$, $B_2$ and $C_2$ represent stationary terminals of a rotary stepping switch 35. This stepping switch includes an arm 36 which engages terminals $A_2$, $B_2$ and $C_2$ in sequence when pulses are supplied to an energizing solenoid 36′. Arm 36 is returned to contact $A_2$ from contact $C_2$ when the next pulse is applied to solenoid 36′. Arm 36 is connected to the second input terminal of recorder 19.

It should be evident that thermistors 12′ and 16′ are connected into a Wheatstone bridge network, the initial balance of which can be obtained by moving the contactor of potentiometer 31. When arm 36 engages terminal $A_2$, the output signal of the bridge network is applied directly to recorder 19. This signal moves pen arm 23 so as to make a record on zone A of paper 20 representative of the output signal of the bridge network. Voltage source 32 is applied across a potential dividing network which is formed by resistors 33 and 34. When arm 36 engages terminal $B_2$, the potential across resistor 33 is added to the output signal from the bridge network so as to move pen arm 23 into zone B. When arm 36 engages terminal $C_2$, the recording pen arm is moved into zone C.

The programmer can comprise a constant speed motor 40 which is energized by a current source 41. The drive shaft 42 of motor 40 carries a series of cams 43, 44, 45 and 46 which actuate respective switches 43′, 44′, 45′ and 46′. Solenoid 36′ is connected in circuit with a current source 48 when switch 43′ is closed; and solenoids 14′ and 23′ are connected in circuit with current source 48 when respective switches 44′ and 45′ are closed. Solenoid 14′ serves to open valve 14 when energized. Solenoid 23′ is associated with pen arm 23 so as to raise this pen arm off paper 20 when energized. Motor 24 is energized by current source 48 when switch 46′ is closed.

The sequence of operation of the programmer is shown in the following table:

| Step | Time | Chart Motor | Stepping Switch Position | Pen Arm Lift Solenoid |
|---|---|---|---|---|
| 1 | $t_0$-$t_1$ | Energized | $A_2$ | Deenergized. |
| 2 | $t_1$-$t_2$ | Deenergized | $A_2$ | Do. |
| 3 | $t_2$-$t_3$ | ----do---- | $A_2$ | Energized. |
| 4 | $t_3$-$t_4$ | ----do---- | $B_2$ | Do. |
| 5 | $t_4$-$t_5$ | ----do---- | $B_2$ | Deenergized. |
| 6 | $t_5$-$t_6$ | ----do---- | $B_2$ | Do. |
| 7 | $t_6$-$t_7$ | ----do---- | $B_2$ | Energized. |
| 8 | $t_7$-$t_8$ | ----do---- | $C_2$ | Do. |
| 9 | $t_8$-$t_9$ | ----do---- | $C_2$ | Deenergized. |
| 10 | $t_9$-$t_{10}$ | ----do---- | $C_2$ | Do. |
| 11 | $t_{10}$-$t_{11}$ | ----do---- | $C_2$ | Energized. |
| 12 | $t_{11}$-$t_{12}$ | ----do---- | $A_2$ | Do. |
| 13 | $t_{12}$-$t_0'$ | ----do---- | $A_2$ | Deenergized. |

The times designated in the foregoing table are shown in Figure 2 of the drawing. At the beginning of the analysis cycle, solenoid 14′ is energized for a short period to open valve 14 to introduce a predetermined volume of the sample mixture into column 10. The various cams employed in the timer are of such configuration as to open and close the associated switches in the sequence set forth. The times at which the peaks appear in the analyzer output can be determined initially by passing samples of the material to be detected into the column and measuring the output signal from the bridge circuit of Figure 3. From the foregoing table it should be evident that paper 20 remains stationary during the time that each of the first three peaks is recorded so that the peaks are recorded as vertical lines, the heights of which are representative of the maximum amplitudes of the peaks. In some applications it may be desirable to record the area under the peaks rather than the maximum amplitude. If this is desired, a suitable integrating circuit can be included between the bridge network and recorder 19. Solenoid 14′ is energized periodically to introduce samples of the mixture into column 10. These times are selected so that the column is purged by the carrier gas between the individual analyses.

Figure 4:
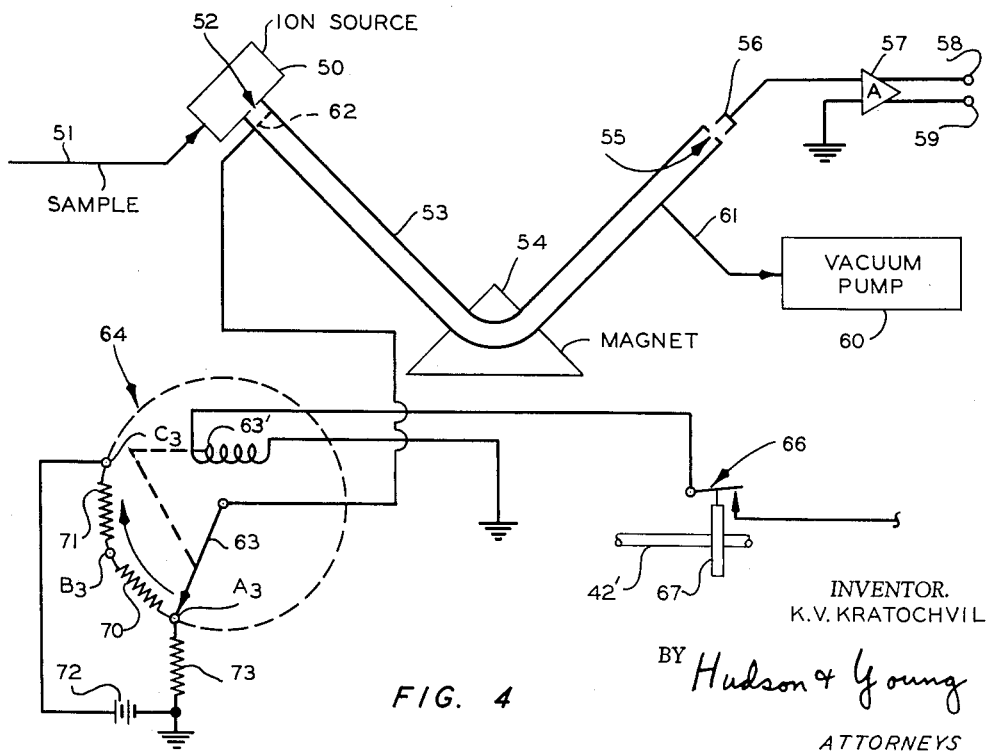
Figure 4 is a schematic representation of a mass spectrometer which includes a portion of the recording system of this invention.

In Figure 4 there is shown a schematic representation of a mass spectrometer having the recording system of this invention associated therewith. The mass spectrometer comprises an ion source 50 which ionizes a gas sample that is introduced therein through a conduit 51. The resulting ions are directed through an aperture 52 so as to pass through an elongated tube 53 which has a curved section that is positioned in the field established by a magnet 54. The ions are deflected by the magnetic field by amounts representative of the individual masses thereof. Ions of a predetermined mass pass through an exit aperture 55 to impinge upon a collector plate 56. Collector plate 56 is connected in the input circuit of an amplifier 57 which provides an output signal between terminals 58 and 59 that is representative of the ions impinging on plate 56. The interior of tube 53 is maintained at a reduced pressure by means of a vacuum pump 60 which is connected thereto by a conduit 61.

Figure 3:
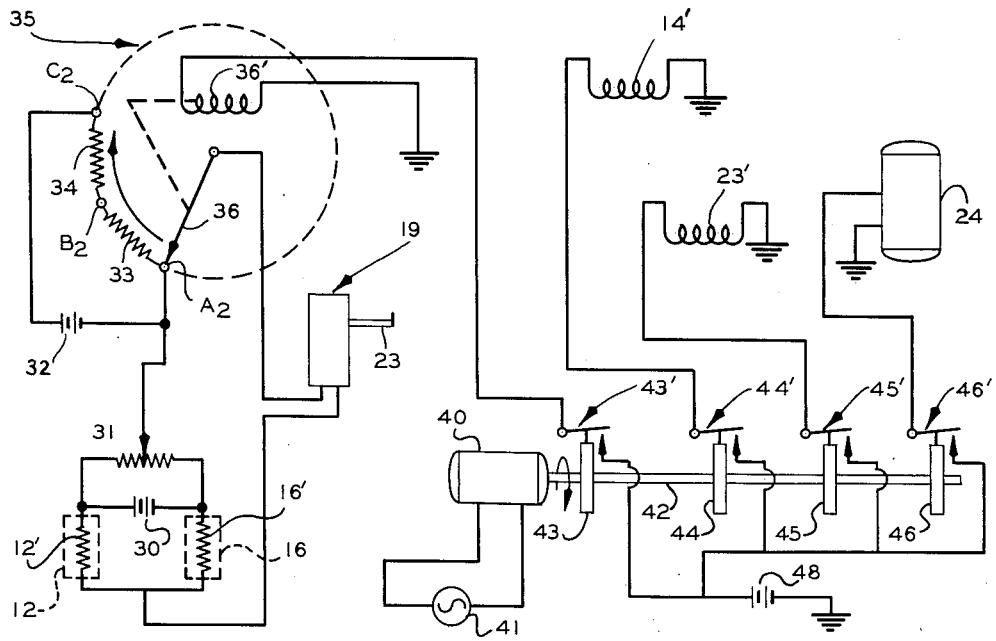
Figure 3 is a schematic circuit drawing of the analyzers and programmer of Figure 1.

Output terminals 58 and 59 correspond to the output terminals of the bridge network of Figure 3 and can be connected in the circuit of Figure 3 by being connected to terminal $A_2$ and recorder 19, respectively. In order to focus ions of different masses on collector plate 56 in sequence, an accelerating electrode 62 is positioned in tube 53 adjacent ion source 50. The magnitude of the potential applied to this electrode determines the velocity of the ions through the tube, and hence the bending of the ion beam by the field of magnet 54. Electrode 62 is connected to the arm 63 of a second stepping switch 64. Arm 63 is moved between adjacent terminals $A_3$, $B_3$ and $C_3$ each time a solenoid 63' is energized. Solenoid 63' is connected in circuit with current source 48 of Figure 3 through a switch 66 which is operated by a cam 67 that is carried by a shaft 42'. Cam 67 can replace cam 44 in this embodiment. Resistors 70 and 71 are connected in series relationship between terminals $A_3$ and $C_3$, the junction therebetween being designated as terminal $B_3$. Terminal $C_3$ is connected to the first terminal of a voltage source 72, and terminal $A_3$ is connected to the second grounded terminal of voltage source 72 through a resistor 73. The potential applied to electrode 62 is thus determined by the contact engaged by switch 63. Motor 40 of Figure 3 rotates cam 67 so that ions of selected masses are focused in sequence on collector plate 56. The remaining portion of the recording system of Figure 3 operates in the manner previously described so that ions of selected masses are recorded as individual lines on paper 20 of recorder 19. Obviously, other types of mass spectrometers, such as those employing electrostatic deflection plates, or time-of-flight instruments, can also be employed in conjunction with the recording system.

From the foregoing description it should thus be evident that there is provided in accordance with this invention an improved system for recording a plurality of signals which are received in timed sequence. This information is recorded in an orderly manner so as to be readily interpreted by a process operator.

While the invention has been described in conjunction with present preferred embodiments, it should be evident that it is not limited thereto.

What is claimed is:

1. Apparatus for recording a plurality of signals, which are received in timed sequence, adjacent one another on a common recording medium which comprises a recording medium; means to mark on said medium; means to position said means to mark relative to said medium in a first direction; first means to move said medium relative to said means to mark in a second direction at right angles to said first direction; second means to move said means to mark out of engagement with said medium; means to establish an adjustable bias signal; means to combine the signals to be recorded with said bias signal and to apply the combined signals to said means to position; timing means to actuate said second means to move, to vary said bias signal, and to deactuate said second means to move in sequence; and means responsive to said timing means to actuate said first means to move said medium in said second direction at a time after said second means to move have been deactuated.

2. The apparatus of claim 1 wherein the signals to be recorded are electrical and wherein said means to establish an adjustable bias signal comprises a voltage source, a potential dividing network connected across said voltage source, and switching means actuated by said timing means to pick off voltages from said network representative of said bias signals.

3. The apparatus of claim 1 wherein said timing means comprises a motor, a plurality of cams carried by the drive shaft of said motor, a current source, and a plurality of switches actuated by respective ones of said cams to connect said current source to actuate and deactuate said means to move and to vary said bias signal.

4. Apparatus for recording a plurality of electrical signals, which are received in timed sequence, adjacent one another on a common recording medium which comprises a chart; means to move said chart in a first direction; a pen arm positioned to mark on said chart in a second direction at right angles with said first direction; means to displace said pen arm in said second direction; means to lift said pen arm out of engagement with said chart; means to establish an adjustable bias electrical signal; means to combine the signals to be recorded with said bias signal and to apply the combined signals to said means to displace; timing means to actuate said means to lift, to vary said bias signal, and to deactuate said means to lift in sequence; and means responsive to said timing means to actuate said means to move said chart in a first direction at a time after said means to lift have been deactuated.

References Cited in the file of this patent

UNITED STATES PATENTS

| | | |
|---|---|---|
| 2,476,005 | Thomas | July 12, 1949 |
| 2,575,711 | Hipple et al. | Nov. 20, 1951 |
| 2,628,149 | Blakeslee | Feb. 10, 1953 |
| 2,692,820 | Alway et al. | Oct. 26, 1954 |

FOREIGN PATENTS

| | | |
|---|---|---|
| 639,937 | Germany | Dec. 16, 1936 |
| 720,097 | Great Britain | Dec. 16, 1954 |